United States Patent
Cohen et al.

(10) Patent No.: US 12,088,796 B2
(45) Date of Patent: *Sep. 10, 2024

(54) HYBRID MEDIA RECORDING

(71) Applicant: RiversideFM, Inc., Palo Alto, CA (US)

(72) Inventors: Roie Cohen, Ashkelon (IL); Gideon Keyson, Jerusalem (IL); Nadav Keyson, Tel Aviv (IL); Sebastian Greco, Milan (IT)

(73) Assignee: RiversideFM, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/501,810

(22) Filed: Nov. 3, 2023

(65) Prior Publication Data

US 2024/0064293 A1 Feb. 22, 2024

Related U.S. Application Data

(63) Continuation of application No. 18/106,821, filed on Feb. 7, 2023, now Pat. No. 11,856,188, which is a
(Continued)

(51) Int. Cl.
*H04N 19/59* (2014.01)
*H04N 19/105* (2014.01)
(Continued)

(52) U.S. Cl.
CPC ......... *H04N 19/105* (2014.11); *H04N 19/154* (2014.11); *H04N 19/59* (2014.11); *H04N 21/4307* (2013.01)

(58) Field of Classification Search
CPC .... H04N 19/59; H04N 19/105; H04N 19/154; H04N 21/4307
See application file for complete search history.

(56) References Cited

U.S. PATENT DOCUMENTS 8,316,267 B2 11/2012 Sun et al.
9,936,264 B1 * 4/2018 Greene ................ H04N 21/812
(Continued)

FOREIGN PATENT DOCUMENTS

WO 2021137856 A1 7/2021

OTHER PUBLICATIONS

_ Active optical range imaging sensors; 1988; P. Bels et al. (Year: 1988).*

(Continued)

*Primary Examiner* — Luis Perez-Fuentes
(74) *Attorney, Agent, or Firm* — Morrison & Foerster LLP

(57) ABSTRACT

Systems and methods relating to presenting media content are disclosed. According to an example method, media data comprising a first media content segment is received. The first media content segment comprises first audio data received via the first user device and first video data received via the first user device, and is encoded according to a first set of encoding parameters. A fault is detected in the first media content segment. Detecting the fault comprises determining a quality value of the first media content segment, and determining whether the quality value exceeds a threshold. A second media content segment is received. The second media content segment comprises second audio data and second video data, and is encoded according to a second set of encoding parameters. The first media content segment is replaced with the second media content segment in the media data. Replacing the first media content segment with the second media content segment comprises synchronizing a first time of the second media content segment to a corresponding first time of the first media content segment, and trimming a length of the second media content segment to a length of the first media content segment.

23 Claims, 11 Drawing Sheets

Related U.S. Application Data continuation of application No. 17/878,641, filed on Aug. 1, 2022, now Pat. No. 11,606,553.

(60) Provisional application No. 63/389,779, filed on Jul. 15, 2022.

(51) Int. Cl.
    *H04N 19/154* (2014.01)
    *H04N 21/43* (2011.01)

(56) References Cited

U.S. PATENT DOCUMENTS

| | | | | |
|---|---|---|---|---|
| 10,645,437 | B2* | 5/2020 | Ramaraj | H04N 21/2662 |
| 11,012,737 | B1* | 5/2021 | Carney Landow | ............ H04N 21/4398 |
| 11,606,553 | B1* | 3/2023 | Cohen | H04L 65/75 |
| 11,770,429 | B2 | 9/2023 | Shribman et al. | |
| 11,856,188 | B1* | 12/2023 | Cohen | H04N 19/59 |
| 2007/0002946 | A1 | 1/2007 | Bouton et al. | |
| 2016/0192029 | A1 | 6/2016 | Bergstrom | |
| 2017/0180736 | A1 | 6/2017 | Yang et al. | |
| 2018/0134217 | A1 | 5/2018 | Peterson et al. | |
| 2020/0099733 | A1* | 3/2020 | Chu | H04N 21/8456 |

OTHER PUBLICATIONS

Final Office Action mailed Jul. 13, 2023, for U.S. Appl. No. 18/106,821, filed Feb. 7, 2023, 12 pages.

International Search Report and Written Opinion mailed Jun. 15, 2023, for PCT Application No. PCT/US2023/022606, eight pages.

Non-Final Office Action mailed Apr. 17, 2023, for U.S. Appl. No. 18/106,821, filed Feb. 7, 2023, 14 pages.

Non-Final Office Action mailed Sep. 30, 2022, for U.S. Appl. No. 17/878,641, filed Aug. 1, 2022, eleven pages.

Notice of Allowance mailed Jan. 20, 2023, for U.S. Appl. No. 17/878,641, filed Aug. 1, 2022, 7 pages.

Notice of Allowance mailed Oct. 4, 2023, for U.S. Appl. No. 18/106,821, filed Feb. 7, 2023, 7 pages.

* cited by examiner

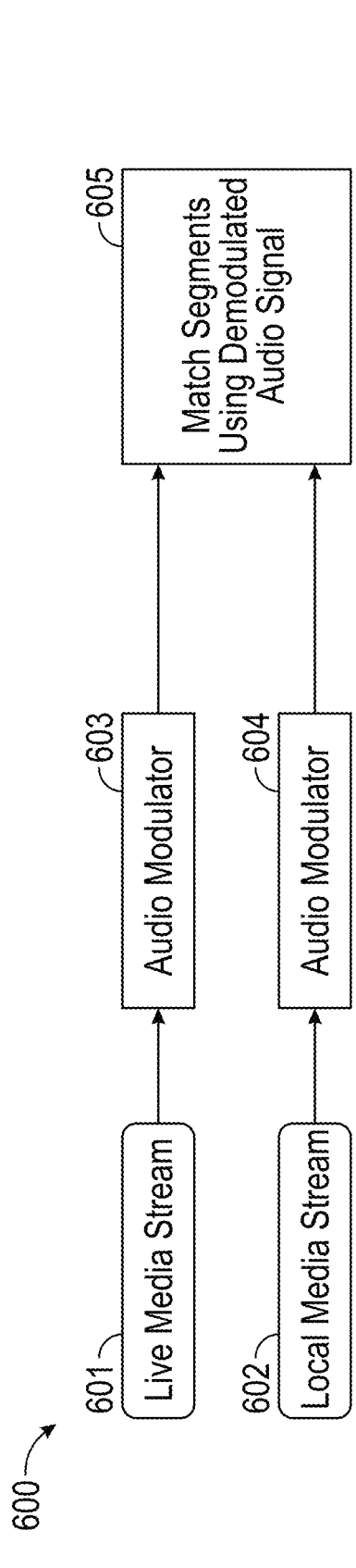
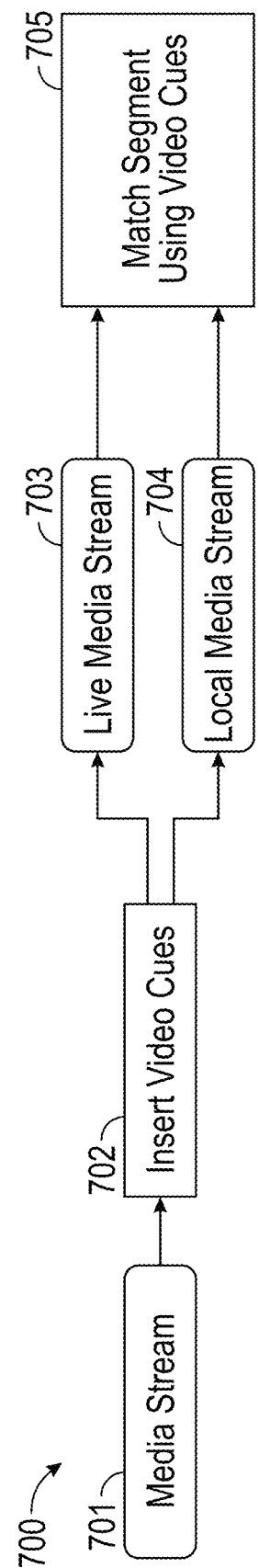
FIG. 6
FIG. 7

HYBRID MEDIA RECORDING

CROSS-REFERENCE TO RELATED APPLICATION

This application is a continuation of U.S. Non-Provisional application Ser. No. 18/106,821, filed Feb. 7, 2023, which is a continuation of U.S. Non-Provisional application Ser. No. 17/878,641, filed Aug. 1, 2022, now U.S. Pat. No. 11,606,553, which claims the benefit under 35 U.S.C. § 119(e) of U.S. Provisional Patent Application No. 63/389,779, filed Jul. 15, 2022, which is incorporated herein by reference in its entirety.

FIELD

Examples of the disclosure relate generally to systems and methods for presenting media content to a user of a computing device, and more specifically, to systems and methods for recording and live-streaming media content including video to a user of a computing device.

BACKGROUND

Digital media content, such as a stream of digital audio and/or video, is encoded for storage and for transmission over a computer network. The choice of how the media content is encoded represents tradeoffs between audio quality, video quality, network latency, processor throughput, network bandwidth, and other resource constraints. Factors such as the nature of the target application, and the type of computing hardware in use, can determine which encoding format may be most appropriate for a particular use case. For example, in an interactive live conferencing application, low latency may be the most important quality of a video stream, as users may be willing to sacrifice audio or video quality to obtain minimum latency. A heavily compressed video format having reduced image quality may be suitable for this application. For a non-interactive video presentation, such as a full-length on-demand video, audio and video quality may be the most important characteristics, with latency being less significant. This type of application may call for encoding the data as minimally compressed, high-quality audio and video, at the expense of data size.

In some systems, a single media presentation can be presented in multiple different environments. For example, in a conferencing application involving multiple live participants, audio and/or video for a conference may be recorded and presented live (e.g., streamed) to each participant in real-time. The conference may also be recorded and stored for download on-demand at a later date. Some systems, such as disclosed herein, can advantageously use multiple encoding formats, each of which may be particularly suited to one or more use cases. For example, a conferencing system can encode a reduced quality version of the conference for presentation in real-time to the conference participants; and simultaneously encode a higher quality version of the conference to be recorded, stored, and made available for download after the conclusion of the conference. By recording encoding formats in this manner, the conferencing application need not apply one single encoding format, representing one set of trade-offs, to all use cases.

Many network-based media content applications can suffer from data failure; for example, video segments may become lost or corrupted, interrupting a video stream. Encoding in multiple formats, as described herein, also offers a solution to this data failure problem. As described herein, video data encoded in multiple formats can be used not only for adapting video to multiple environments (e.g., live streaming, on-demand video), but also for providing data redundancy and error correction for faulty segments. Encoding video as described herein for the dual purposes of (1) adapting a single video presentation to multiple environments and (2) error checking and correction represents an improvement to media content presentation technology.

BRIEF SUMMARY

According to an example method, media data comprising a first media content segment is received. The first media content segment comprises first audio data received via the first user device and first video data received via the first user device, and is encoded according to a first set of encoding parameters. A fault is detected in the first media content segment. Detecting the fault comprises determining a quality value of the first media content segment, and determining whether the quality value exceeds a threshold. A second media content segment is received. The second media content segment comprises second audio data and second video data, and is encoded according to a second set of encoding parameters. The first media content segment is replaced with the second media content segment in the media data. Replacing the first media content segment with the second media content segment comprises synchronizing a first time of the second media content segment to a corresponding first time of the first media content segment, and trimming a length of the second media content segment to a length of the first media content segment.

BRIEF DESCRIPTION OF THE DRAWINGS

FIG. 6 illustrates an example of synchronizing media segments, according to some embodiments.

FIG. 7 illustrates an example of synchronizing media segments, according to some embodiments.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Figure 1:
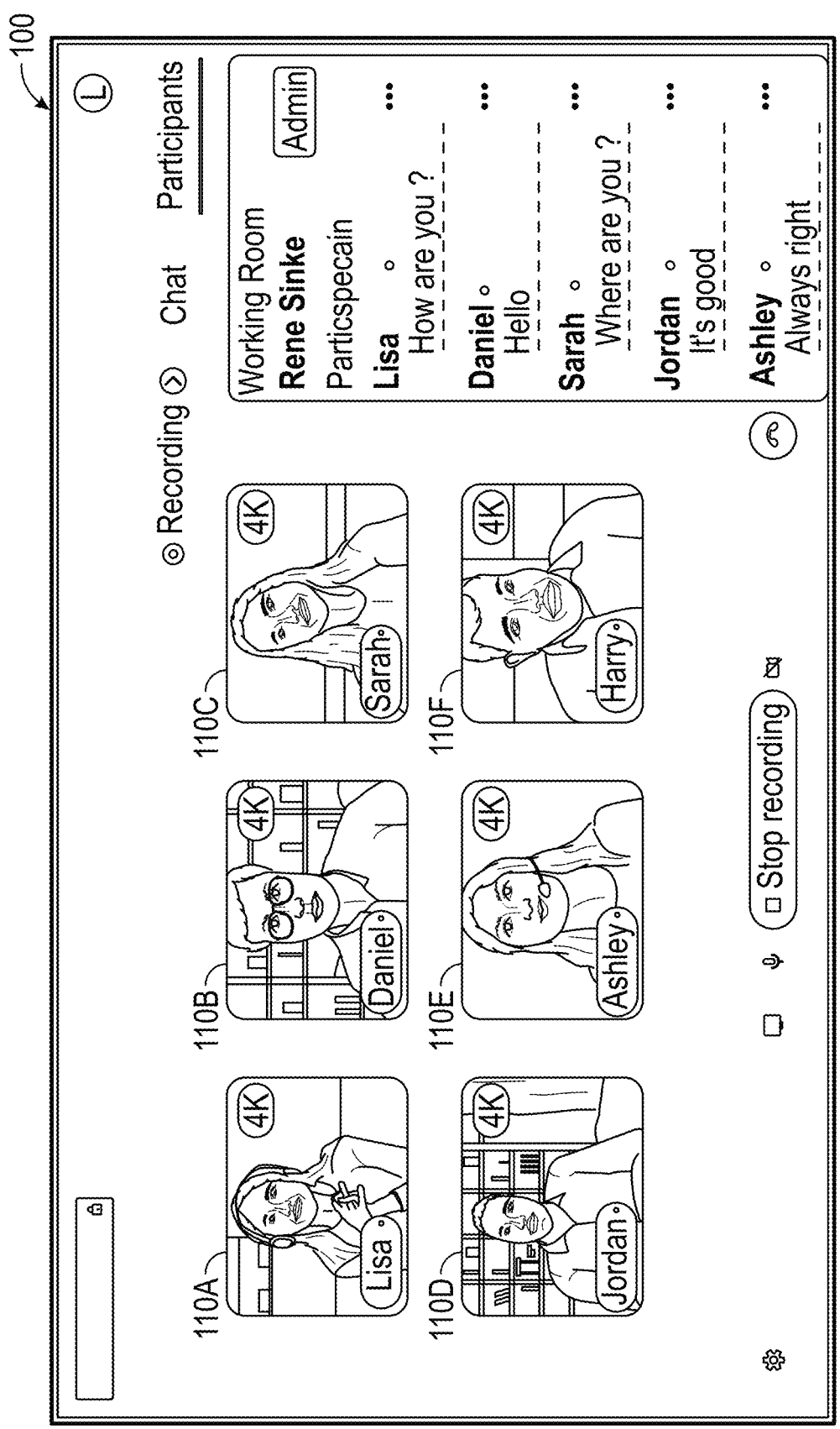
FIG. 1 illustrates a view of an example media content presentation application according to some embodiments.

FIG. 1 illustrates a view of an example application that can be used in connection with embodiments described herein. In FIG. 1, application 100 is a conferencing application that permits the upload and download of media data (e.g., media content that can include audio and/or video data) via a network by participants in a session. Media data can include one or more media content segments (e.g., one or more audio segments and/or one or more video segments). FIG. 1 shows a view of application 100 from the perspective of a participant. In the example shown, each of participants 110A through 110F in the session (collectively, participants 110) can see his or her own live audio and video, along with the live audio and video of other participants. Participants 110 can also perform other operations, such as screen sharing, file transfer, text messaging, gaming functionality, or social media functionality. In some embodiments, audio and video corresponding to part or all of a session can be recorded and made available for future playback. In some embodiments, application 100 can permit streaming media data, and participants 110 can choose whether to only stream audio and video data from their devices (i.e., provide an outgoing stream of audio and video from the devices), or to both stream and record a version of the audio and video data. In some embodiments, whether a participant streams and/or records audio and/or video can be determined by another participant; by an application host; by the application itself (e.g., without direct participant input); by a third party; or by the participant himself or herself. In some embodiments, participants may opt to view or record video or audio data without streaming audio or video data themselves. In some embodiments, application 100 may be an audio-only application, such as a podcasting application, without a streamed video component. In some audio-only embodiments, video may be recorded, but not streamed (e.g., to conserve bandwidth). In some embodiments, each of participants 110 may be associated with a client that interfaces with a server via application 100. In some embodiments, each of participants 110 communicates with other participants via application 100 in a peer-to-peer configuration. Participants may join a session of application 100 using a suitable device, such as described below with respect to client 210A of FIG. 2. In some embodiments, application 100 is a mobile phone application or a computer application (e.g., a PC or Mac application). In some embodiments, users connect to application 100 via a web browser (e.g., via an extension for the Google Chrome web browser). In some embodiments, part or all of the session can be redistributed via third party publishing services (e.g., YouTube, Twitter). In some embodiments, part or all of the session can be recorded for future publishing, for distribution via video-on-demand services, or for archival purposes.

Figure 2:
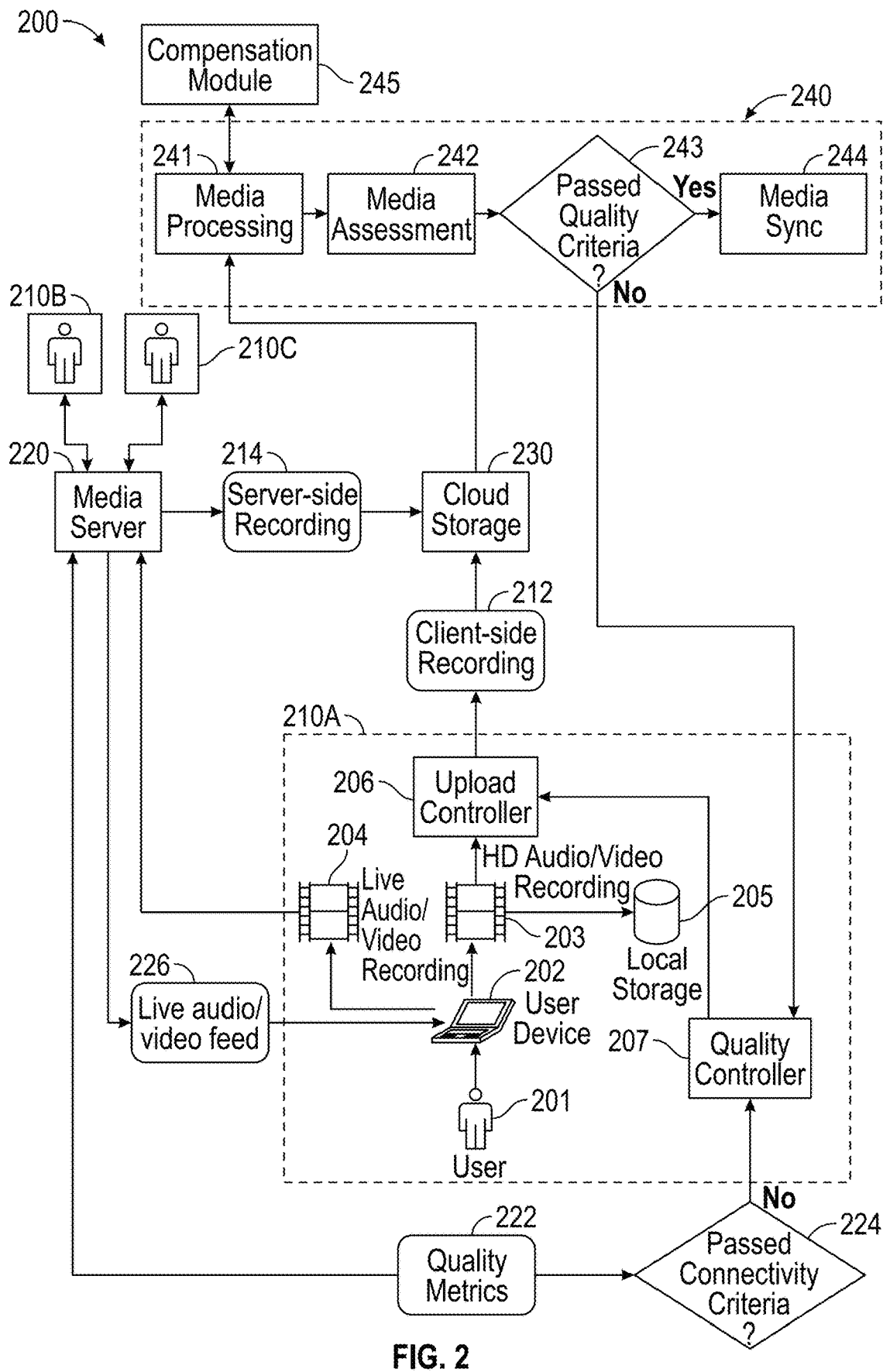
FIG. 2 illustrates an example system diagram according to some embodiments.

FIG. 2 illustrates an example system 200 that be used to implement embodiments described herein. For instance, example system 200 can be used to implement the example conferencing application 100 described above. Example system 200 includes media server 220, which in some embodiments may correspond to a server in communication with application 100 described above. In some embodiments, media server 220 can comprise one or more file servers, database servers, web servers, application servers, selective forwarding units (SFUs), streaming media servers, or any other suitable server or combination of servers. In some embodiments, media server 220 need not comprise a server, and can comprise a controller or other suitable device in communication with application 100. For example, in some embodiments, media server 220 can comprise a media ingestion controller. In example system 200, media server 220 communicates with one or more clients, such as clients 210A, 210B, and 210C (collectively clients 210), such as via a computer network, to send and/or receive media data. System 200 can include any suitable number of clients 210. In some embodiments, clients 210 are remote to media server 220, but in some embodiments, clients 210 and media server 220 may be co-located or may share common hardware. Clients 210 can include, or can be implemented with, one or more computer processors configured to execute instructions to perform operations described herein. In some embodiments, clients 210 need not be clients in a client-server configuration, and can communicate with media server 220 (or other elements of system 200) via any suitable technology (e.g., peer-to-peer communication).

In example system 200, client 210A corresponds to user 201 (which may be one of participants 110 described above with respect to application 100). Each of client 210B and 210C can uniquely correspond to another user, which may be another of participants 110 described above with respect to application 100. The users corresponding to clients 210B and 210C may participate in a session of application with user 201, such that the users interact with each other via the session. Example operations of client 210A are described below. Operations of clients 210B and 210C are not shown in detail in FIG. 2, but these clients (or other clients of the system) can be understood to operate in a manner analogous to that described for client 210A.

In the example shown, user 201 interacts with one or more user devices 202, which can include a device capable of executing or interacting with a conferencing application, such as application 100 described above. User device 202 can include, or communicate with, one or more desktop or laptop computers, mobile phones, tablets, virtual reality or augmented reality devices, or any other suitable devices. User device 202 can include, or communicate with, one or more output devices, such as a display or a speaker; one or more input devices, such as a mouse, keyboard, touchscreen, camera, or microphone; a data storage device such as a memory; and one or more processors in communication with any the above and configured to execute instructions.

In some embodiments, user 201 can interact with two or more user devices 202. For example, user devices 202 can include a desktop or laptop computer and a mobile device (e.g., a smartphone or tablet); two mobile devices; or two desktop or laptop computers. User devices 202 can include two or more cameras or microphones configured to record user 201. In embodiments with two or more user devices 202, the user devices can be associated with the same client 210A; or can be associated with different clients (e.g., client 210A and client 210B).

As user 201 participates in an application session, such as by creating an audiovisual performance, user device 202 can create one or more audio and/or video recordings of user 201. For example, user device 202 can record audio data for user 201 using a microphone, and user device 202 can concurrently record video data for user 201 using a camera. The audio data can be processed by user device 202. For example, the audio data and video data can be encoded and saved as a file for storage; and/or encoded and streamed in real time to other participants (e.g., users of clients 210B and 210C) and/or to a server. The audio data and video data can be processed in any other suitable manner, including by encoding the audio and video data according to any suitable parameters or using any suitable technique. FFmpeg, GStreamer, or any other suitable tool or codec, can be used to encode the audio and/or video data. In some embodiments, encoding of audio and/or video data may be performed in whole or in part by client 210A. In some embodiments, encoding may be performed in whole or in part by, e.g., media server 220 or cloud storage 230.

In some embodiments, two or more user devices 202 can create first and second recordings of the performance, thereby creating first and second audio and video data of the first and second recordings. Two or more user devices 202 can participate in, and be in communication with, the same application session; and can create the first and second recordings simultaneously. In some embodiments, the first and second recordings can differ according to an audio parameter and/or a video parameter. Audio parameters can include, but are not limited to, a microphone type; a microphone distance; a microphone directivity; an audio processing filter (e.g., a software filter for noise reduction, or for manipulating or enhancing audio); and/or any other suitable parameter. Video parameters can include, but are not limited to, a view angle; a field of view; a depth of field; a focal point; a lens type; an aspect ratio; an optical filter; a video processing filter (e.g., a software filter for providing blur, coloration, image enhancement, chroma keying ("green screen"), or other effects); and/or any other suitable parameter. For example, a first user device 202 can create a first recording of a user's performance, with the first recording having a first view angle (e.g., a close-up view of user 201); and a second user device 202 can create a second recording of the same performance, with the second recording having a second view angle (e.g., a wide-angle view of user 201). In some embodiments, the first and second recordings can be provided as input to a compositing process that outputs a composite of the first and second recordings. In some embodiments, the first and second recordings can be provided as input to an audio/video editing application. In some embodiments, using the compositing process, the audio/video editing application, or other suitable techniques, a single audio and/or video file can be generated from the first and second recordings. In addition, the skilled artisan will recognize that additional recordings, beyond two, can be created and used in an analogous manner. For example, in some embodiments, three user devices 202 can create first, second, and third recordings of a performance, which can be used such as described above.

In the example in FIG. 2, user device 202 creates a high-definition (HD) audio/video recording 203. HD recording 203 can comprise, for example, audio and/or video data encoded for a high bitrate (e.g., high resolution and framerate with minimal compression). In some embodiments, HD recording may be an MPEG-4 file, or any other suitable file type. In the example shown, HD recording 203 is stored in local storage 205, which can be local to client 210A. Local storage 205 can include a hard drive, a solid state drive, an optical drive, or any other suitable storage device. A purpose of HD recording 203 may be for retrieval of a high quality recording by user 201, or another user, at a later time. However, because of its size and bitrate, HD recording 203 may be suboptimal for live streaming or other applications in which the video is transmitted via a network. In such situations, audio and/or video data can be encoded for a lower bitrate; smaller, compressed files with lower bitrates may be preferable due to their potentially lower latency and more efficient use of network bandwidth. In the example in FIG. 2, a "live" recording 204 of audio and/or video is created concurrently with HD recording 203. In some embodiments, live recording 204 can be generated from HD recording 203, for example by downsampling HD recording 203. In some embodiments, live recording 204 can be separate from (and not derivative of) HD recording 203. Live recording 204 can include data encoded at a lower bitrate for network transmission; for example, the data may be encoded at a lower resolution or framerate, or with greater compression, than HD recording 203. In some embodiments, a reliability of live recording 204 may be lower than a reliability of HD recording 203; for example, a risk of data failure may be higher for recordings that are encoded to minimize latency and network bandwidth. In some embodiments, live recording 204 is adaptable to current network conditions, such that the audio and/or video quality of live recording 204 increases as more network bandwidth becomes available, and vice versa. Live recording 204 can be generated using MPEG-DASH, Apple HTTP Live Streaming (HLS), Microsoft Smooth Streaming, or using any other suitable codec, platform, or technology. In some embodiments, HD recording 203 is created on an ongoing basis. In some embodiments, segments of HD recording 203 are encoded on-demand; for example, a buffer of raw data can be maintained, and encoded upon receipt of an encoding instruction. Because encoding audio/video data is commonly a CPU intensive process, this technique can be used to optimize CPU usage, particularly on client devices that are CPU constrained.

In some embodiments, two or more user devices 202 can be used to generate two or more HD recordings 203 and/or live recordings 204. One or more of multiple HD recordings 203 can be stored on local storage 205 as described above. One potential advantage of such embodiments is redundancy; for example, if one of two user devices 202 encounters a failure, HD recording 203 or live recording 204 corresponding to the second of two user devices can be utilized instead. Another potential advantage of such embodiments is that multiple HD recordings 203 or live recordings 204 can be used to provide alternate versions of a performance; that is, recordings of a performance that differ according to an audio parameter or a video parameter, such as described above.

Live recording 204 and/or HD recording 203 can each comprise one or more audio segments and/or one or more corresponding video segments. A segment can be of any suitable length, such as 1, 2, 4, 6, 10, or 15 seconds. In some embodiments, segments may be of variable lengths. In some embodiments, a segment of HD recording 203 can correspond to a segment of live recording 204. In some embodiments, the corresponding segments can have the same start time and end time and correspond to the same portion of content (though encoded according to different parameters). In some embodiments, the start times and end times may not be the same, such that corresponding segments may overlap.

Client 210A can provide live recording 204 to media server 220 on a live (streaming) basis. For example, client 210A can initiate a connection to the media server 220, and audio and/or video data (e.g., TCP or UDP packets) belonging to live recording 204 can be communicated via a computer network from client 210A to media server 220. Similarly, clients 210B and 210C, in a common session with client 210A, can concurrently provide live streams to media server 220. Media server 220 can then deliver, via a computer network, a live audio/video feed to each client in the session. For example, client 210A can receive, from media server 220, live audio/video feed 226 containing audio/video streams from clients 210B and 210C; client 210B can receive audio/video streams from clients 210A and 210C; and client 210C can receive audio/video streams from clients 210A and 210B. In some embodiments (e.g., those using a SFU to transmit media content), live audio/video feed 226 may be communicated directly among clients 210. Application software executed by each client can present the audio and/or video for each client. For example, application software executed by client 210A can concurrently present audio and video received from media server 220 for clients 210B and 210C, in addition to audio and video for client 210A (e.g., audio and video from HD recording 203 or live recording 204), for instance in a manner such as shown in FIG. 1 for the example conferencing application 100. In this manner, users corresponding to clients 210A, 210B, and 210C can see, hear, and interact with each other in real time. In some embodiments, clients 210 can also communicate documents, screen images, social media actions, game data, or events (e.g., remote recording commands) to each other. In some embodiments, clients 210 can send and receive data, or perform various functions described herein, in a peer-to-peer network configuration, without the involvement of a media server.

In example system 200, media server 220 generates a server-side audio/video recording 214 based on audio and/or video data received from clients 210 as described above. The server-side recording 214 can include a composite of audio and/or video received at media server 220 from one or more of clients 210 (e.g., live recording 204 received from client 210A). Server-side recording 214 can be made available for download by clients 210 or by other users. Server-side recording can be generated using FFmpeg or any other suitable tool or codec. In example system 200, media server communicates server-side recording 214 to cloud storage 230, such as via a computer network. Cloud storage 230 can include one or more storage servers, and in some embodiments may include media server 220. Cloud storage 230 may make server-side recording 214 available for retrieval, e.g., by making server-side recording 214 available for download by clients 210 or by other users.

Server-side recording 214 is prone to various types of data failure. As described above, server-side recording 214 can be based on audio and/or video data received from clients 210 via a computer network. Computer networks, particularly wireless networks, are subject to outages, fluctuations in available bandwidth, and other interruptions. Audio/video packets, frames, or segments can be dropped, corrupted, or received out of order. Further, in adaptive streaming systems, resolution or bitrate can drop below an acceptable quality threshold. In some examples, data failure may be the result of a user device 202 disconnecting from a network, disconnecting from an application session, or encountering some other type of device failure. These data failures compromise the user's experience by interrupting playback and participation in a session; by making the quality of media content less consistent; and by introducing unreliability into a system that users may rely on for important communications. Further, as described above, audio and/or video data received from clients 210 can be encoded to minimize latency and network bandwidth at the expense of reliability, increasing the chances of data failure.

As described above, HD recording 203 can be recorded by client 210A and saved to local storage. HD recording 203 provides the advantage of offering user 201 a high-quality version of the audio/video content that can be viewed at a later time, for example if user 201 wishes to replay a conference session. HD recording 203 can present another advantage: providing a backup version of the session's audio and video that can be used to correct errors or failures in the data received at media server 220. As described herein, system 200 represents an improvement to media streaming systems by allowing errors in media data to be corrected with reference to a secondary recording (e.g., an HD recording). This can improve the reliability and performance of such systems by minimizing the amount of media content that would otherwise be corrupted or lost to various errors.

As shown in FIG. 2 and example system 200, client 210A is in communication with media server 220 and cloud storage 230, such as via a computer network. In some embodiments, client 210A can provide, to cloud storage 230, a client-side recording 212 that includes all or part of HD recording 203. Cloud storage 230 can store client-side recording 212, and the client-side recording 212 can be used to replace and synchronize faulty segments of server-side recording 214, such as described herein. In some embodiments, client-side recording 212 is uploaded from client 210A to cloud storage 230 via a progressive upload process. In some embodiments, client-side recording 212 can be provided by client 210A to media server 220.

In some embodiments, an upload controller module 206 controls the upload of client-side recording 212 to cloud storage 230. For example, upload controller module 206 can control which portions of HD recording 203 are uploaded, and when those portions are uploaded. In some embodiments, upload controller uploads by default all portions of HD recording 203. In some embodiments, specific portions of HD recording 203 are uploaded to cloud storage 230 on demand, as requested, or in response to a determination that a particular portion of HD recording 203 is needed.

In some embodiments, such as described above, multiple HD recordings 203 can be generated by multiple user devices 202. In such embodiments, one or more of multiple HD recordings 203 can be provided to cloud storage on demand, as requested, or in response to a determination that a particular version of HD recording 203 is needed. For example, in response to a determination that one of multiple user devices 202 (e.g., a laptop computer) has disconnected from an application session, or experienced some other failure, an HD recording 203 corresponding to another user device 202 (e.g., a smartphone) can be requested and provided. In some embodiments, multiple HD recordings 203 can correspond to different recordings or renditions of a performance (e.g., recordings corresponding to different view angles); and an HD recording 203 corresponding to a particular recording or rendition can be requested and provided.

In some embodiments, a quality controller module 207 provides instruction to upload controller module 206, and upload controller module 206 uploads a segment of HD recording 203 based on that instruction. (In some embodiments, upload controller module 206 and quality controller module 207 can be the same module.) In some embodiments, quality controller module 207 can instruct upload controller module 206 to delete a segment or another portion of audio/video data. For example, quality controller module 207 may instruct the upload controller module 206 to delete a segment in order to preserve or free up storage of local storage 205. In some embodiments, after a segment of HD recording 203 is uploaded, the segment is deleted from local storage 205. In some embodiments, a segment is only deleted after confirming that a high-quality rendition of the segment is present in storage. In some embodiments, quality metrics 222 can be analyzed at stage 224 to determine whether certain connectivity or audio/video quality criteria are met. For example, quality metrics 222 can include metrics quantifying network connectivity (e.g., available bandwidth, latency, network status); a number of dropped frames; a bitrate; a resolution; and/or a frame rate. In some embodiments, quality metrics 222 can include metrics quantifying one or more aspects of audio and/or video quality. In some embodiments, quality metrics 222 can be determined empirically (e.g., via a network analyzer or audio/video analyzer), can be received from media server 220, can be received from client 210A, or can be obtained from another suitable source. Stage 224 can determine, based on quality metrics 222, whether a threshold value for connectivity or audio/video quality is met. For example, stage 224 can determine whether a computer network meets a certain standard for reliability, such as by comparison against one or more threshold values for uptime, bandwidth, media content quality, latency, or other metrics as appropriate. In some embodiments, stage 224 can analyze audio or video to determine whether one or more aspects of audio/video quality meet a threshold value. In some embodiments, AI-based classifiers can be used to make these determinations. For example, AI-based classifiers can be used to determine whether a computer network has sufficient connectivity; or whether, based on an audio/video analysis, whether an aspect of audio/video meets a minimum level. In some embodiments, threshold values can be specified on a per-participant basis. For example, a threshold value might be higher for a participant who is particularly significant (e.g., a group leader, a participant who is particularly active, or a participant with a large social media presence), and lower for a participant who is not. In some examples, threshold values can change dynamically. For instance, if it is determined at stage 224 that a threshold value for connectivity or audio video quality is not met, an input can be provided accordingly to quality controller module 207, which can in turn use that information to instruct upload controller module 206 to upload portions (e.g., one or more segments) of HD recording 203 in response. For example, if it is determined at stage 224 that network conditions are sufficiently poor, quality controller 207 can instruct upload controller module 206 to provide a portion of HD recording 203 to cloud storage 230. In some embodiments, such as described above, segments of HD recording 203 are encoded on-demand; for example, a buffer of raw data can be maintained, and encoded upon receipt of an encoding instruction. For instance, quality controller 207 can instruct client 210A (e.g., user device 202 or upload controller 206) to encode and upload to cloud storage 230 one or more segments of HD recording 203 in response to a determination that network conditions are sufficiently poor.

In some embodiments, all or part of HD recording 203 or client-side recording 212 can be compressed, or otherwise modified to reduce a file size before being provided by client 210A. This may be beneficial, for instance, in examples where client 210A is constrained by processor limits, storage constraints, network bandwidth, or other limitations. In such embodiments, HD recording 203 or client-side recording 212 can be modified by reducing a frame rate; lowering an audio or video resolution; reducing an audio or video bitrate; changing encoding parameters; reducing an audio sampling rate; applying a compression algorithm; using AI-based techniques for reducing file size; or any other suitable technique.

In some embodiments, after HD recording 203 or client-side recording 212 is communicated to cloud server 230 or media server 220 as described above, a compensation process can be applied, for example by a compensation module 245, which in some embodiments may be part of the cloud server 230 or media server 220, or in communication with the cloud server 230 or media server 220 or other suitable elements of system 200. For instance, in an example in which HD recording 203 is modified by reducing a video frame rate, compensation module 245 can compensate by increasing a frame rate of the received video, such as by interpolating between frames. As another example, if HD recording 203 is modified by reducing a video resolution, compensation module 245 can compensate by upscaling or increasing a resolution of the received video, such as by using an AI-based "super resolution" approach. As another example, if HD recording 203 is modified by reducing an audio sample rate, compensation module 245 can compensate by increasing a sample rate of the received audio, for instance by using an AI-based "super sampling" technique. As another example, if HD recording 203 is modified by reducing a bitrate, compensation module 245 can compensate by applying a smoothing technique to remove artifacts introduced by the bitrate reduction. Other suitable examples will be apparent to the skilled artisan and are within the scope of the disclosure.

With respect to FIG. 2, processes 240 can assess whether server-side recording 214 includes a portion (e.g., one or more segments) that should be replaced by a portion of client-side recording 212, as described herein; and, if so, synchronize the portion of client-side recording 212 with server-side recording 214. Preferably, processes 240 are performed by one or more processors external to client 210A. For example, processes 240 can be performed by one or more processors of media server 220 or cloud storage 230, or processors of a dedicated server processing cluster in communication with media server 220 and/or cloud storage 230 (e.g., via a computer network). In some embodiments, replacing a portion of server-side recording 214 with a portion of client-side recording 212 can include an audio and/or video compensation process such as described above.

According to some embodiments, media processing module 241 can receive media data from cloud storage 230. For example, cloud storage 230 can communicate audio and/or video data (such as all or a portion of server-side recording 214) to media processing module 241. In some embodiments, media processing module 241 can receive media data directly from media server 220. In some embodiments, the media data can include media data provided by a streaming process. In some embodiments, the media data can include static data (e.g., a static media file on a disk). Media processing module 241 can perform appropriate processing on this media data (e.g., transcoding, color correction, multiplexing) for the media data to be further analyzed. In some embodiments, media processing module 241 can communicate with compensation module 245. As described above, media data can include one or more media content segments. According to some embodiments, media assessment module 242 receives a media content segment from media processing module 241 (or in some cases directly from cloud storage 230). Media assessment module 242 evaluates the media content segment, as described in more detail below, resulting in an output associated with a quality level of the media content segment. At stage 243, the output is evaluated to determine whether the quality level of the media content segment meets quality criteria, such as one or more threshold values of media content quality. If the media content segment meets the quality criteria, media sync module 244 can perform a trimming and/or synchronization operation on the media content segment, such as described below. If the media content segment does not meet the quality criteria, then client 210A can provide a corresponding segment from HD recording 203, e.g., via quality controller module 207 and/or upload controller module 206, such as described above. If the corresponding segment does not exist in HD recording 203, then client 210A can encode the corresponding segment (which may have been previously captured) and upload it to cloud storage 230 as described above.

Figure 3:
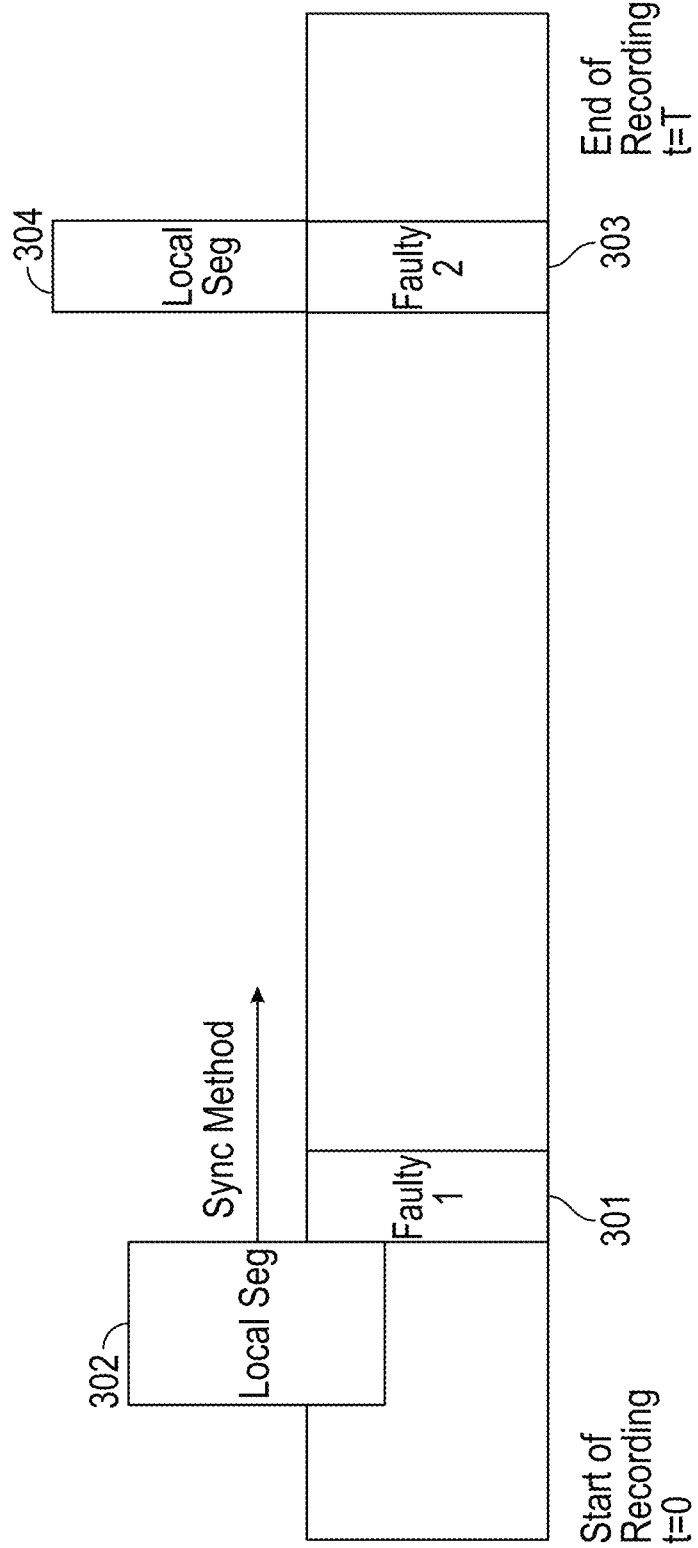
FIG. 3 illustrates an example of synchronizing media data, according to some embodiments.

FIG. 3 illustrates an example process of replacing a segment of media data, i.e., an example process that uses client-side recording 212 to replace a faulty segment of server-side recording 214 in an example recording that begins at time t=0 and ends at time t=T. This example process can be performed by one or more processors, such as one or more processors associated with cloud storage 230, media server 220, and/or media sync module 244 with respect to example system 200. In some embodiments, the process can be performed on the media data while the media data is being streamed. In some embodiments, the process can be performed on static media data that is not being streamed concurrently. According to some embodiments, client-side recording 212 comprises one or more segments, which can correspond to the segments described above for client 210A. The segments of client-side recording 212 may, but need not, have the same start and end points, or duration, as corresponding segments of server-side recording 214. In the example shown in FIG. 3, faulty segment 301 is identified as described below. Local segment 302 of client-side recording 212 is identified, and includes content of faulty segment 301 (although in some instances local segment 302 is encoded differently than faulty segment 301). Local segment 302 may or may not have the same start point, end point, and duration as faulty segment 301. Media sync module 244 can align local segment 302 to faulty segment 301, e.g., by positioning a start time of local segment 302 in server-side recording 214 at a start time that corresponds to the start time of faulty segment 301. (In some embodiments, other suitable times of the segments other than a start time may be used.) Media sync module 244 can also trim local segment 302 to faulty segment 301, i.e., by adjusting the length of local segment 302 to match the length of faulty segment 301. The trimming can be performed before, after, or concurrently with aligning the segments as described above. In FIG. 3, local segment 304 is a local segment that is aligned to faulty segment 303, trimmed to the length of faulty segment 303, and positioned at an appropriate time between the beginning and end of the server-side recording 214. In some embodiments, the alignment and/or trimming can be performed on the server-side recording 214. In some embodiments, the alignment and/or trimming can be performed on the client-side recording 212.

Figure 4:
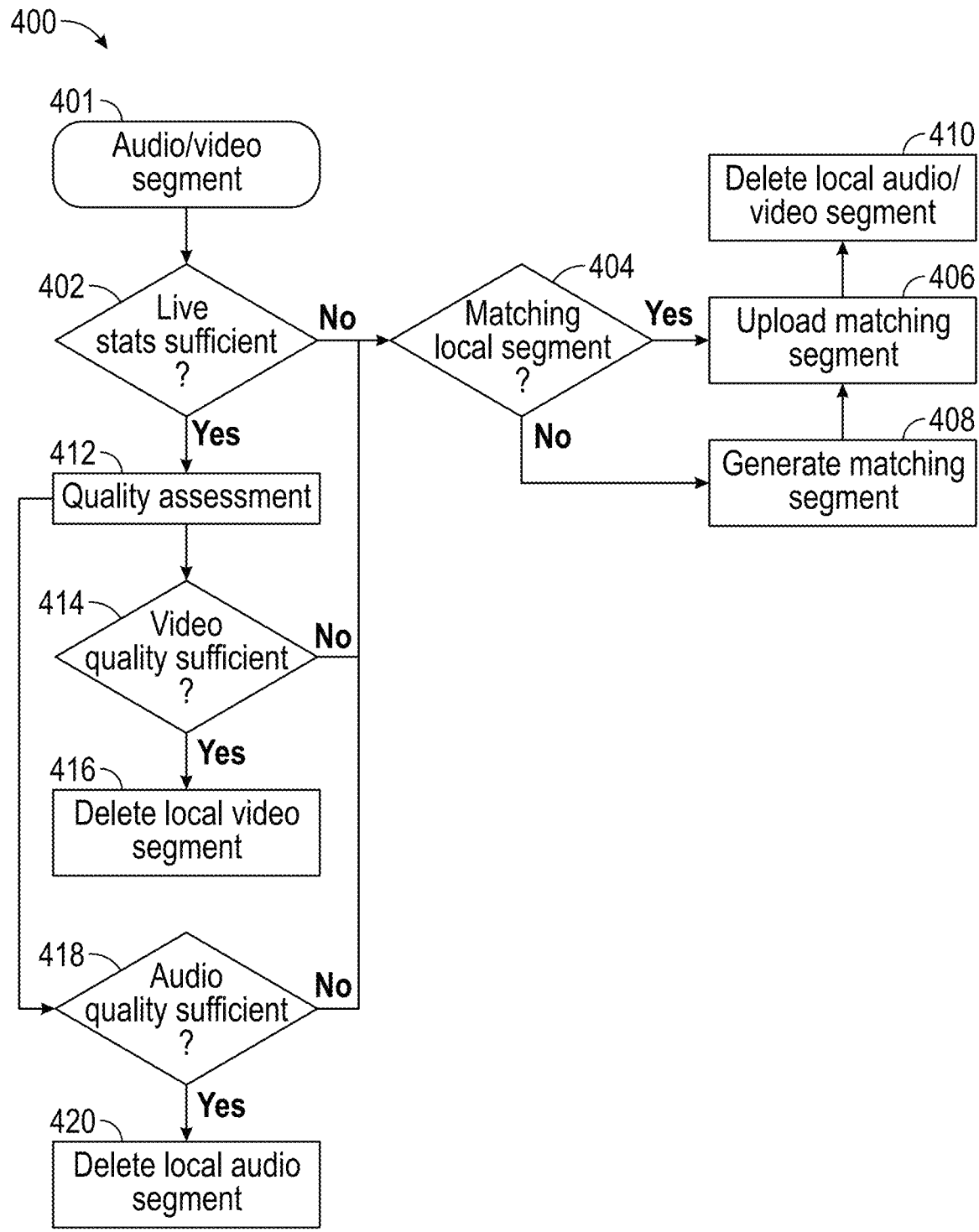
FIG. 4 illustrates an example of correcting a data fault, according to some embodiments.

FIG. 4 shows an example process 400 for detecting and correcting a faulty segment of media data according to some embodiments. Process 400 can be a process performed by one or more elements of example system 200 described above. For example, process 400 can be performed by one or more of upload controller module 206, quality controller module 207, and/or media sync module 244. Similarly, process 400 can be performed by client 210A, media server 220, and/or cloud storage 230. In example process 400, an audio and/or video segment 401 belonging to server-side recording 214 is provided as input. At stage 402, it is evaluated (e.g., based on quality metrics 222) whether network conditions are insufficient to meet network quality standards, such that the segment should be replaced by a corresponding segment from client-side recording 212 (such as described above for FIG. 3). (Stage 402 may correspond to stage 224, described above with respect to system 200.) If the network conditions are not sufficient, then it is determined at stage 404 whether there is a segment in HD recording 203 that corresponds to segment 401. If so, the corresponding segment is provided for replacement of the faulty segment (406), such as described below. If not, then client 210A may generate the corresponding segment (408), which can then be provided and used to replace the faulty segment (406). In some cases, the segment may be deleted from local storage afterwards (410).

If it is determined at stage 402 that the network conditions are sufficient, then a quality assessment 412 can be performed on segment 401. (Quality assessment 412 may correspond to media assessment 242 described above with respect to system 200.) In examples where segment 401 includes both a video component and an audio component, quality assessment 412 can evaluate the video and audio components independently to determine whether segment 401 should be replaced, such as described in more detail below. For example, at stage 414, if it is determined that the video quality is insufficient, the process continues to stage 404 for replacement of segment 401 with a corresponding segment of client-side recording 212, such as described above. In some embodiments, if the video quality is sufficient, then the corresponding segment may be deleted from local storage (416). Similarly, at stage 418, if it is determined that the audio quality is insufficient, the process continues to stage 404 for replacement of segment 401 with a corresponding segment of HD recording 203, such as described above. In some embodiments, if the video quality is sufficient, then the corresponding segment may be deleted from local storage (420). In some embodiments, a quality of the audio and video components can be considered together, such as described below with respect to example process 900.

Figure 5:
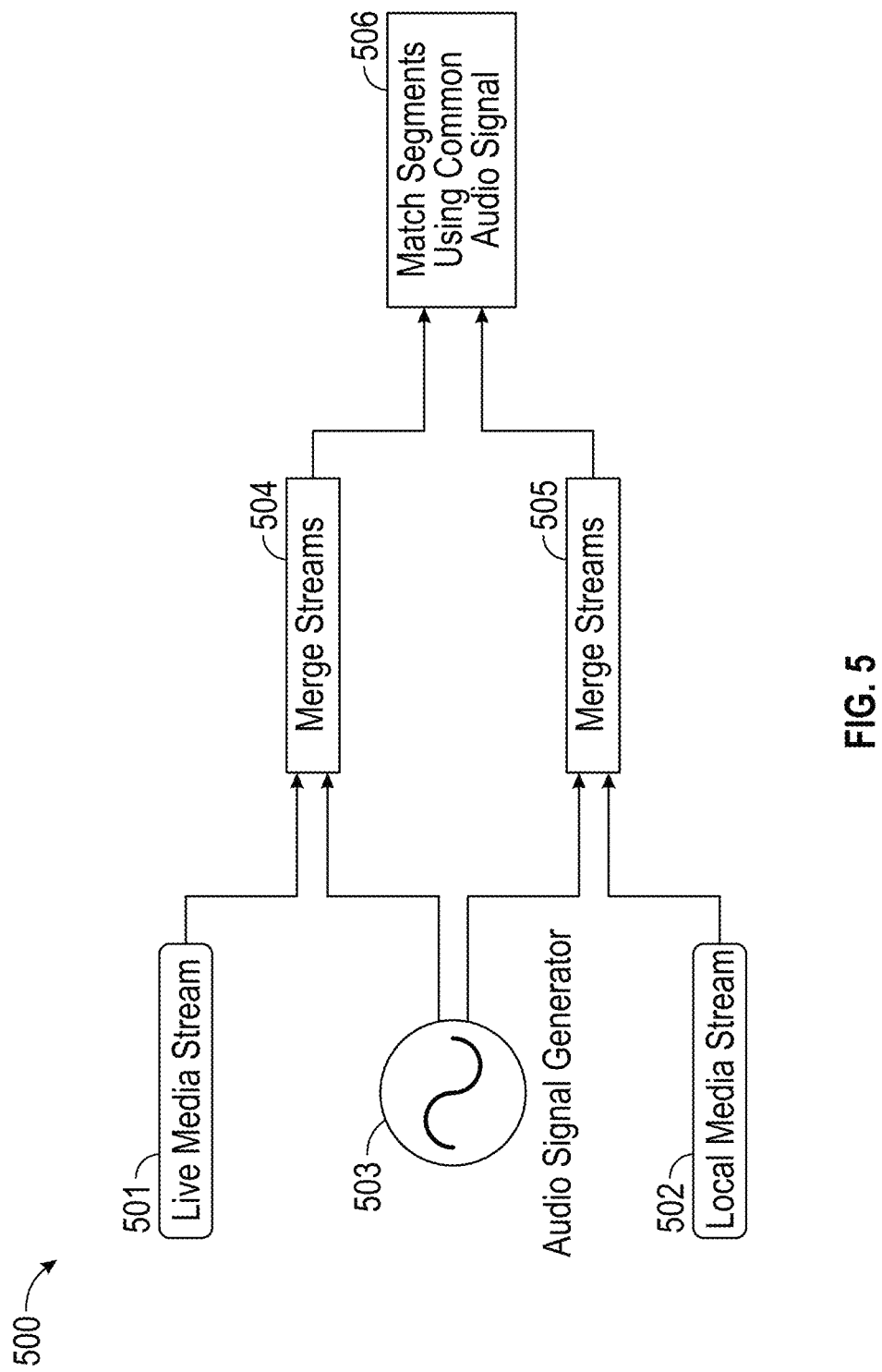
FIG. 5 illustrates an example of synchronizing media segments, according to some embodiments.

FIG. 5 shows an example process 500 for synchronizing a segment of a live media stream with a segment of a local media stream. Process 500 can be a process performed by media sync module 244 of example system 200 described above, or by another suitable component of system 200. In process 500, a common audio signal is used to synchronize one or more segments of a live media stream 501 (which may correspond to server-side recording 214) with a corresponding one or more segments of a local media stream 502 (which may correspond to client-side recording 212). In some embodiments, audio signal generator 503 outputs any suitable audio signal. That audio signal is provided to stage 504, where it is merged with live media stream 501; and the same audio signal is provided to stage 505, where it is merged with local media stream 502. The output of stage 504 and the output of stage 505 are provided as inputs to stage 506, which utilizes the common audio signal present in both inputs to synchronize live media stream 501 with local media stream 502. For example, at stage 506, a start time of a segment of live media stream 501 can be matched to a start time of a segment of local media stream 502 by identifying a point in the audio signal that corresponds to both start times. In some embodiments, other suitable times other than start times can be used.

FIG. 6 shows an example process 600 for synchronizing a segment of a live media stream with a segment of a local media stream. Process 600 can be a process performed by media sync module 244 of example system 200 described above, or by any other suitable element. In process 600, modulation is used to synchronize one or more segments of a live media stream 601 (which may correspond to server-side recording 214) with a corresponding one or more segments of a local media stream 602 (which may correspond to client-side recording 212). At stage 603, live media stream 601 is modulated at a modulation frequency, and the output is provided as a first input to stage 605. At stage 604, local media stream 602 is modulated at the same modulation frequency, and the output is provided as a second input to stage 605. Stage 605 can demodulate the first input and the second input, and use the demodulated signals to identify corresponding segments of live media stream 601 and local media stream 602. For instance, in some embodiments, a cross-correlation value can be determined for the demodulated signals using known techniques. If a cross-correlation value exceeds a threshold value, segments associated with the cross-correlation value can be identified as corresponding segments.

FIG. 7 shows an example process 700 for synchronizing a segment of a live media stream with a segment of a local media stream. Process 700 can be a process performed by media sync module 244 of example system 200 described above, or by any other suitable element. In process 700, cues (e.g., video cues) are added at stage 702 to an input media stream 701 to produce live media stream 703 (which may correspond to server-side recording 214) and local media stream 704 (which may correspond to client-side recording 212). Live media stream 703 and local media stream 704 can be provided as input to stage 705, which uses the video cues to match a segment of the live media stream 703 with a corresponding segment of the local media stream 704.

Figure 8:
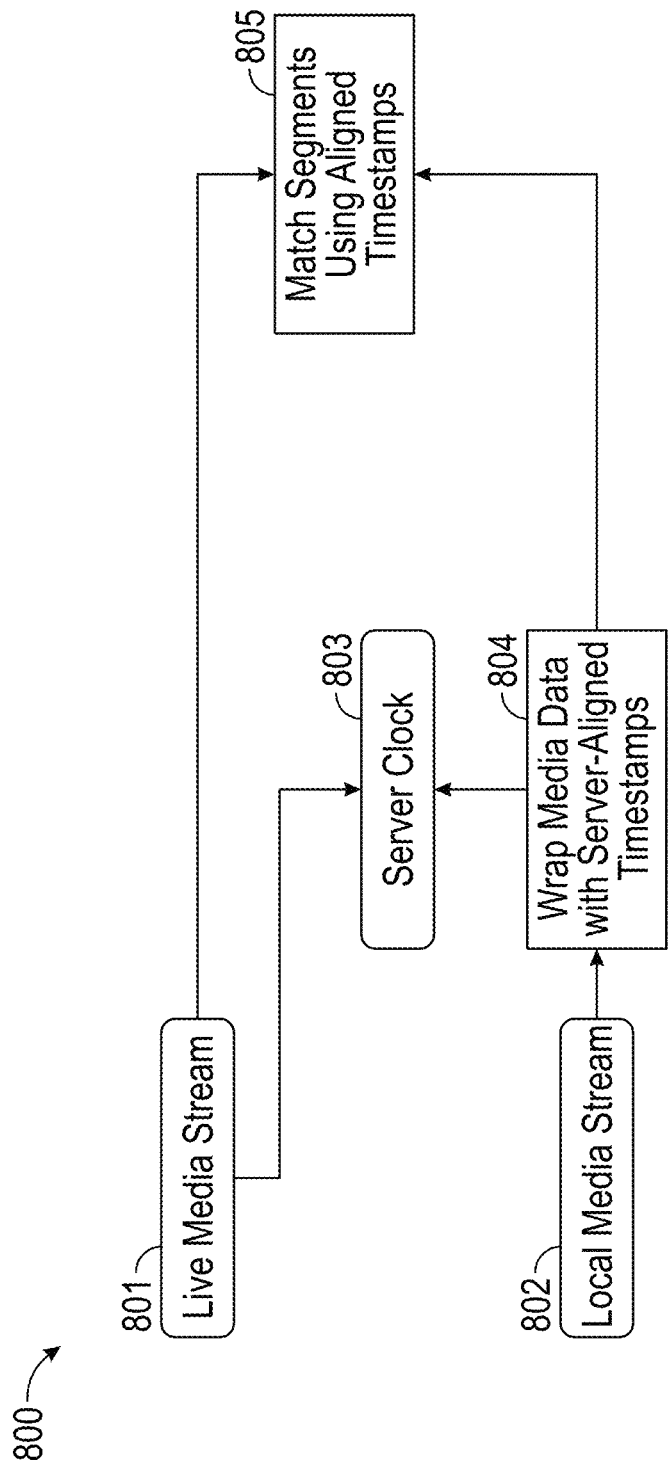
FIG. 8 illustrates an example of synchronizing media segments, according to some embodiments.

FIG. 8 shows an example process 800 for synchronizing a segment of a live media stream with a segment of a local media stream. Process 800 can be a process performed by media sync module 244 of example system 200 described above, or by any other suitable element. In process 800, timestamps are used to synchronize one or more segments of a live media stream 801 (which may correspond to server-side recording 214) with a corresponding one or more segments of a local media stream 802 (which may correspond to client-side recording 212). According to some embodiments, in process 800, timestamps aligned with a server clock 803 are applied to segments of live media stream 801 (e.g., by media server 220). At stage 804, the server-aligned timestamps are applied to segments of local media stream 802. At stage 805, the timestamps are used to identify segments of live media stream 801 that correspond to segments of local media stream 802. For example, it can be determined at stage 805 that a segment of live media stream 801 that has a particular timestamp corresponds to a segment of local media stream 802 that has the same timestamp.

Figure 9:
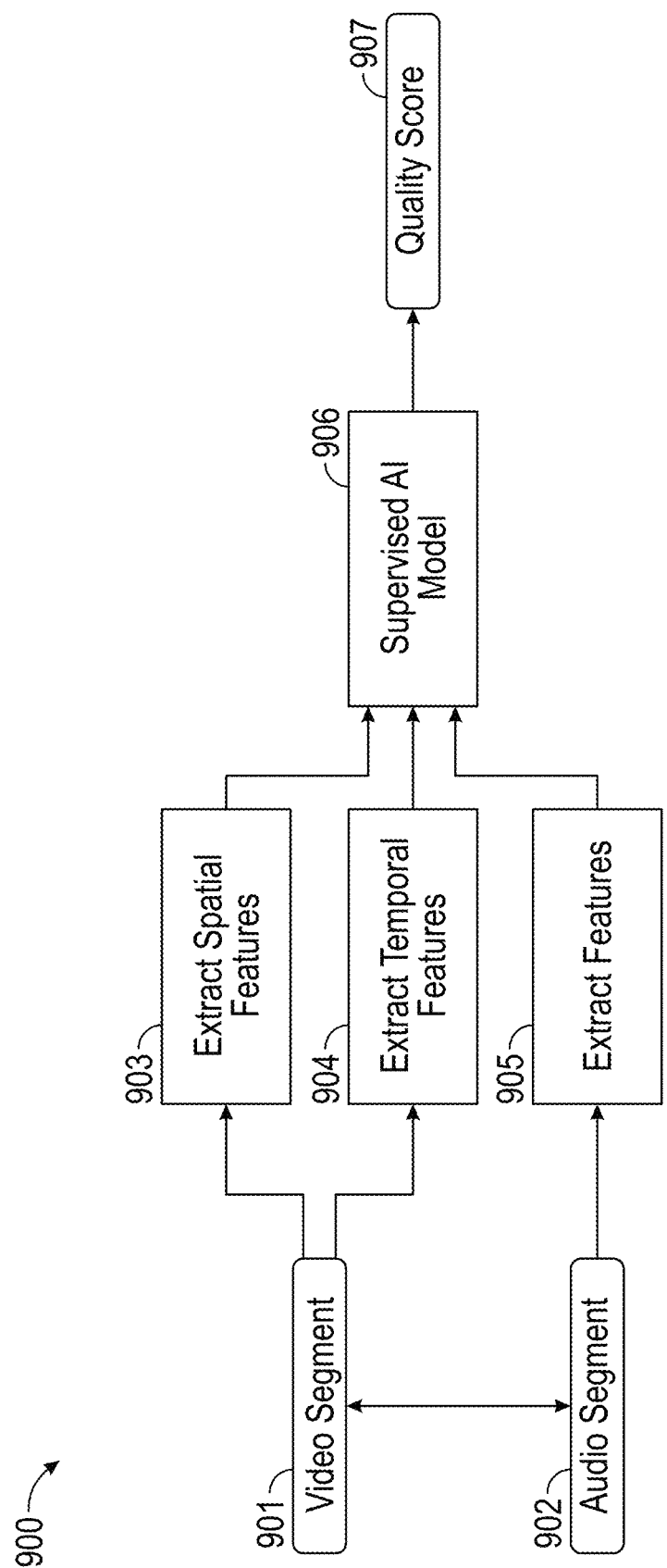
FIG. 9 illustrates an example of determining segment quality, according to some embodiments.

FIG. 9 shows an example process 900 for determining a quality of a media segment. Process 900 can be a process performed by media assessment module 242 of example system 200 described above, by quality assessment module 412 of example process 400 described above, or by any other suitable element. Process 900 shows an artificial intelligence-based approach that uses supervised learning techniques to evaluate media segment quality. In example process 900, video segment 901 and audio segment 902 may correspond to video and audio components of a media segment, such as segment 401 of example process 400, described above. Spatial features and temporal features can be extracted (903, 904) from video segment 901 according to techniques familiar to those skilled in the art. Similarly, features (e.g., audio features) of audio segment 902 can be extracted (905) according to techniques familiar to those skilled in the art. The extracted features are provided as input to a supervised AI model (906), which can use supervised learning techniques to generate a quality score 907 based on the input features. Various supervised learning techniques suitable for this purpose are known in the art. For example, AI model 906 can be generated and refined based on the output of subjective evaluations of audio/video quality, with those evaluations related to features such as those extracted at stages 903, 904, and 905. In some embodiments, neural networks, support vector machines, regression techniques, Bayesian techniques, decision trees, nearest neighbor algorithms, or other supervised learning methods can be employed to implement stage 906 or other aspects of process 900.

Figure 10:
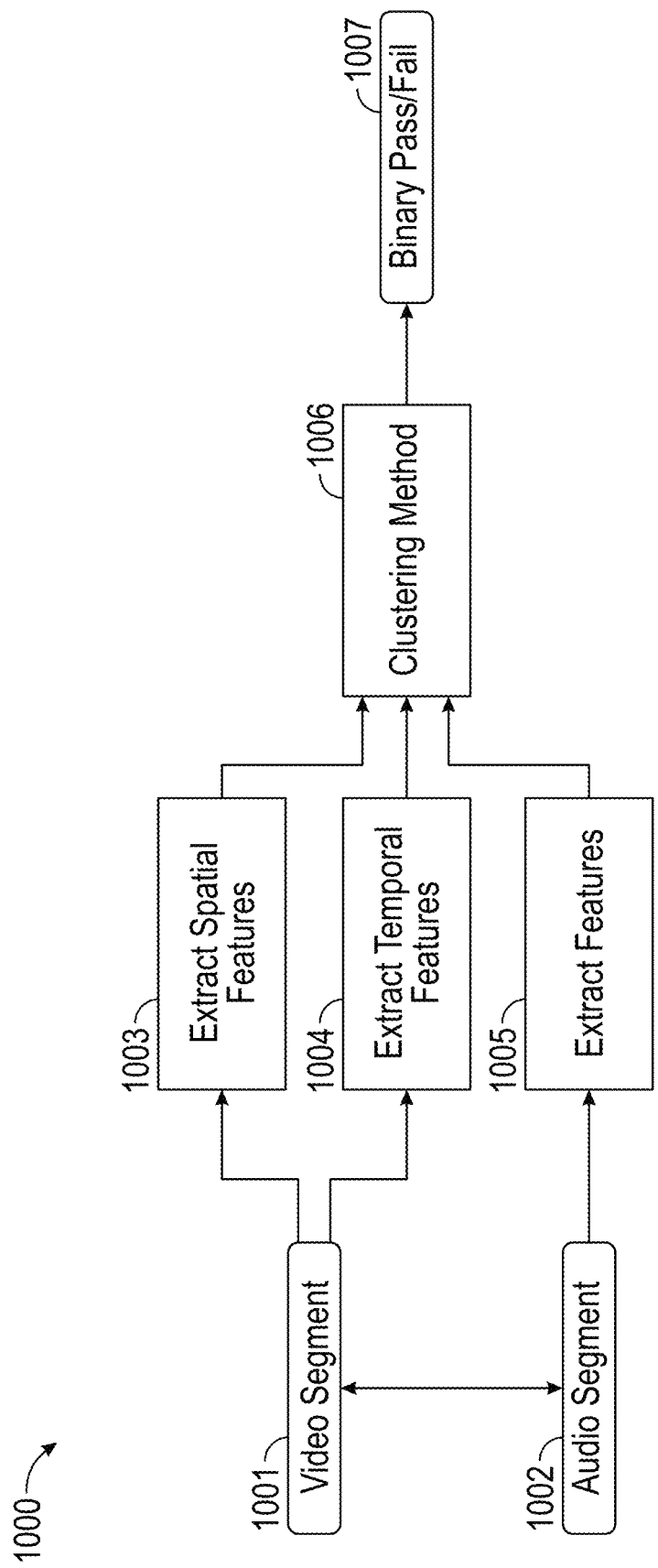
FIG. 10 illustrates an example of determining segment quality, according to some embodiments.

FIG. 10 shows an example process 1000 for determining a quality of a media segment. Process 1000 can be a process performed by media assessment module 242 of example system 200 described above, by quality assessment module 412 of example process 400 described above, or by any other suitable element. Process 1000 shows an artificial intelligence-based approach that uses unsupervised learning techniques to evaluate media segment quality. In example process 1000, video segment 1001 and audio segment 1002 may correspond to video and audio components of a media segment, such as segment 401 of example process 400, described above. Spatial features and temporal features can be extracted (1003, 1004) from video segment 1001 according to techniques familiar to those skilled in the art. Similarly, features of audio segment 1002 can be extracted (1005) according to techniques familiar to those skilled in the art. The extracted features are provided as input to stage 1006, which can use clustering methods to generate a pass/fail score 1007 based on the input features. Clustering techniques suitable for this purpose are known in the art. For example, the features extracted at stages 1003, 1004, and 1005 can be applied as input to algorithms that partition clusters of audio/video quality data (e.g., as "sufficient" or "insufficient" quality), and assign a segment to one of the partitions. In some embodiments, centroid-based clustering, density-based clustering, hierarchical clustering, or other techniques can be employed to implement stage 1006 or other aspects of process 1000.

Figure 11:
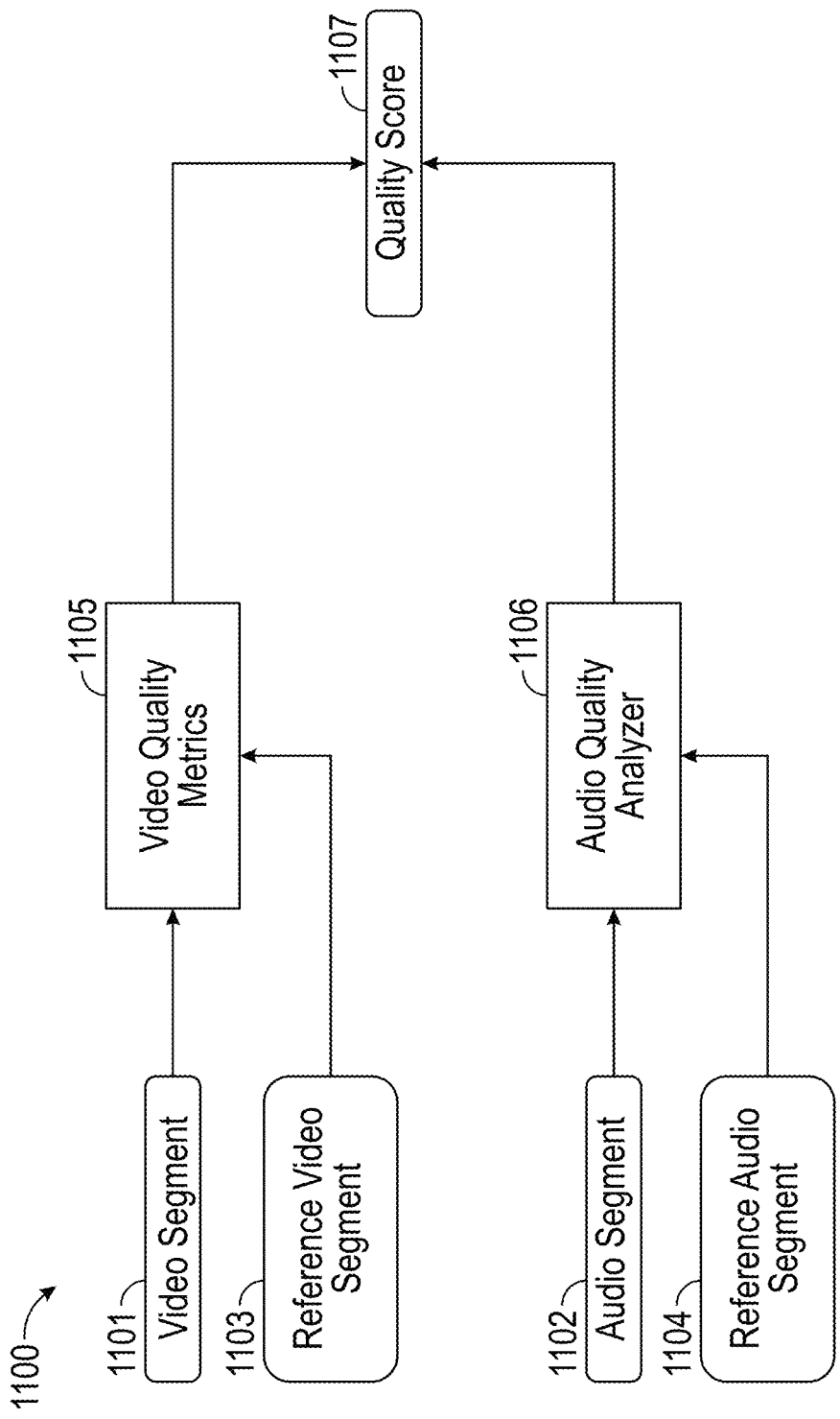
FIG. 11 illustrates an example of determining segment quality, according to some embodiments.

FIG. 11 shows an example process 1100 for determining a quality of a media segment. Process 1100 can be a process performed by media assessment module 242 of example system 200 described above, by quality assessment module 412 of example process 400 described above, or by any other suitable element. Process 1100 uses reference segments to evaluate media segment quality. In example process 1100, video segment 1101 and audio segment 1102 may correspond to video and audio components of a media segment, such as segment 401 of example process 400, described above. At stage 1105, video segment 1101 can be compared against a reference video segment 1103, having a known video quality, and video quality metrics can be generated based on the comparison. Similarly, at stage 1106, audio segment 1102 can be compared against a reference audio segment 1104, having a known audio quality, and audio quality metrics can be generated based on the comparison. The outputs of stages 1105 and 1106 can be applied to generate a quality score 1107, which may describe a quality of a media segment that includes both video segment 1101 and audio segment 1102.

The examples described herein can be performed or implemented via one or more computers, computing devices, or computing systems (including conventional computers and including mobile devices, such as smartphones). Examples of the disclosure may be implemented in any suitable form, including hardware, software, firmware, or any combination of these, using any suitable programming language or technology. Devices used to implement examples of the disclosure can include one or more processors (e.g., CPUs, GPUs, DSPs) configured to execute instructions stored on transitory or non-transitory computer-readable media, thereby performing one or more steps of one or more methods described herein. For example, computer-readable media can include optical media (e.g., CD-ROM, DVD-ROM, Blu-Ray, etc.); a memory; or any other medium capable of being accessed by a computer. Embodiments described herein can be implemented in any suitable format, including hardware or software in any suitable combination. A communications network (e.g., the Internet) can be used to communicate data between two or more elements or nodes of a system described herein, such as between two computers or other devices (e.g., smartphones or mobile devices). These communications can include communication via wired (e.g., Ethernet) or wireless (e.g., Wi-Fi, Bluetooth) communication channels and digital or analog communication channels. Other suitable technologies for implementing the examples disclosed herein will be familiar to the skilled artisan and are within the scope of this disclosure.

Figure 12:
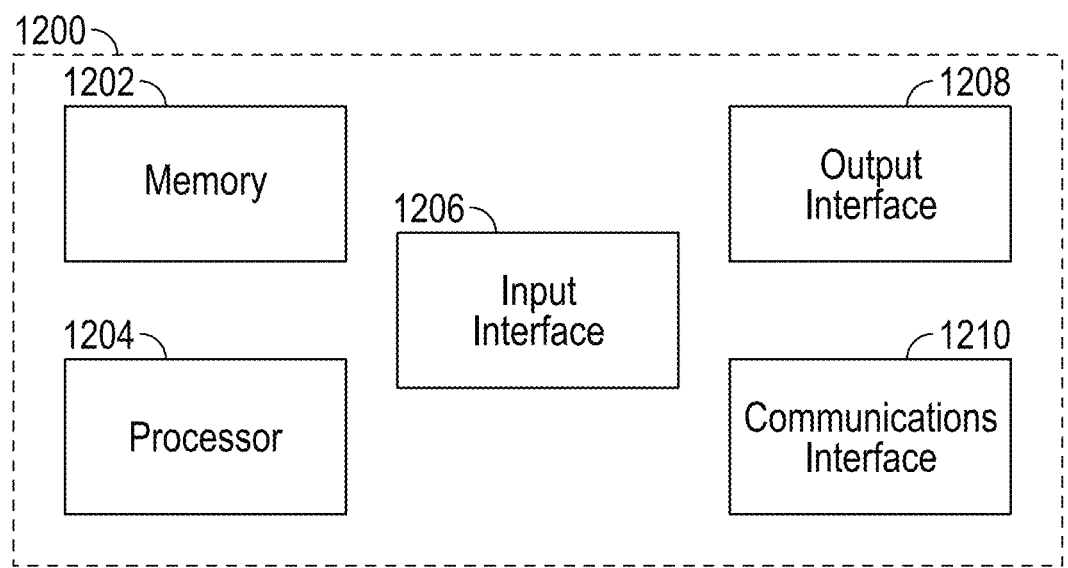
FIG. 12 illustrates an example computer system for implementing various examples of the disclosure.

FIG. 12 illustrates an example computer 1200 such as described above. Computer 1200 can be used to implement one or more of the example methods described herein. As shown in the figure, the example computer 1200 includes or communicates with a memory 1202, a processor 1204, an input interface 1206, an output interface 1208, and a communications interface 1210. Memory 1202 may include volatile storage (e.g., random access memory (RAM)) and non-volatile storage (e.g., read only memory (ROM) of a hard disk). Non-volatile storage can include application programs and/or an operating system. In some examples, the systems and methods described herein may be implemented via application programs executing on a server and/or a client device. Processor 1204 can include any suitable processor or processors (e.g., one or more CPUs, GPUs, DSPs) for executing instructions, such as instructions stored in memory 1202. Input interface 1206 may include any suitable interface to computer 1200, such as a keyboard, mouse, touch screen, camera, microphone, sensor, or biometric device. Output interface 1208 may include any suitable output device for computer 1200, such as a conventional display (e.g., a conventional television or computer monitor), a printer, or a head-worn virtual reality or augmented reality display. Communications interface 1210 can allow communication between devices or nodes on a network, such as described above. In some examples, the memory 1202, processor 1204, input interface 1206, output interface 1208, and communications interface 1210, or any suitable combination of the above, can be interconnected by a bus. The skilled artisan will appreciate that the above description of an example computer system 1200 is non-limiting and that any suitable component, technology, or combination of the above for computer system 1200 is within the scope of the disclosure.

While the above examples are described with respect to video content that may include audio content, it will be understood that aspects of the disclosure can be applied to audio-only content (e.g., music, podcasts) that may not have a video component. Further, the disclosure can be applied to assets comprising still images, GIF files, or other suitable types of media.

According to some examples, a method disclosed herein comprises receiving media data comprising a first media content segment, the first media content segment comprising first audio data received via a first user device and first video data received via the first user device, the first media content segment encoded according to a first set of encoding parameters; detecting a fault in the first media content segment, wherein detecting the fault comprises determining a quality value of the first media content segment and determining whether the quality value exceeds a threshold; receiving a second media content segment, the second media content segment comprising second audio data and second video data, the second media content segment encoded according to a second set of encoding parameters; and replacing, in the media data, the first media content segment with the second media content segment, wherein replacing the first media content segment with the second media content segment comprises: synchronizing a first time of the second media content segment to a corresponding first time of the first media content segment, and trimming a length of the second media content segment to a length of the first media content segment. In some examples, synchronizing the first time of the second media content segment to the corresponding first time of the first media content segment comprises: identifying the first time of the first media content segment based on a portion of the first media content segment corresponding to a portion of an audio signal; and identifying the first time of the second media content segment based on a portion of the second media content segment corresponding to the portion of the audio signal. In some examples, determining the quality value of the first media content segment comprises: determining a spatial feature based on a video component of the first media content segment; determining a temporal feature based on the video component of the first media content segment; determining an audio feature of an audio component of the first media content segment; and applying the spatial feature, the temporal feature, and the audio feature as input to an artificial intelligence model. In some examples, the first audio data and first video data received via the first user device comprise audio data and video data received from the first user device via a streaming process; the second audio data and second video data comprise audio data and video data received via a progressive upload process; the first set of encoding parameters is associated with a first bitrate; and the second set of encoding parameters is associated with a second bitrate higher than the first bitrate. In some examples, the method further comprises presenting the media data to a user of the first user device via a conferencing application executing via one or more processors of the first user device. In some examples, each of the first audio data, the first video data, the second audio data, and the second video data comprises data recorded by the first user device at a first time. In some examples, each of the first audio data and the first video data comprises data recorded by the first user device at a first time; each of the second audio data and the second video data comprises data recorded by the first user device at a second time later than the first time; the method further comprises, in response to detecting the fault, communicating a signal to the first user device; and each of the second audio data and the second video data further comprises data recorded by the first user device in response to the first user device receiving the signal. In some examples, the second audio data comprises audio data recorded by the first user device; and the second video data comprises video data recorded by the first user device. In some examples, the second audio data comprises audio data recorded by a second user device; and the second video data comprises video data recorded by the second user device, wherein the first user device and the second user device are in communication with a session of a computer application. In some examples, the second user device comprises a mobile device. In some examples, the method further comprises: in response to detecting the fault, communicating a signal to the second user device, wherein: the fault is associated with a disconnection of the first user device from the session, and each of the second audio data and the second video data further comprises data recorded by the second user device in response to the second user device receiving the signal. In some examples, the first video data comprises a first recording of a performance, the second video data comprises a second recording of the performance, and the second recording differs from the first recording according to a video parameter. In some examples, the video parameter comprises one or more of a view angle, a field of view, a depth of field, a focal point, a lens type, an aspect ratio, an optical filter, and a video processing filter. In some examples, receiving the second media content segment comprises receiving an output of a file size reduction, and replacing the first media content segment with the second media content segment further comprises applying a compensation to the output of the file size reduction. In some examples, the file size reduction comprises a reduction in video resolution, and the compensation comprises an increase in video resolution.

According to some examples, a system disclosed herein comprises one or more processors configured to perform a method comprising: receiving media data comprising a first media content segment, the first media content segment comprising first audio data received via a first user device and first video data received via the first user device, the first media content segment encoded according to a first set of encoding parameters; detecting a fault in the first media content segment, wherein detecting the fault comprises determining a quality value of the first media content segment and determining whether the quality value exceeds a threshold; receiving a second media content segment, the second media content segment comprising second audio data and second video data, the second media content segment encoded according to a second set of encoding parameters; and replacing, in the media data, the first media content segment with the second media content segment, wherein replacing the first media content segment with the second media content segment comprises: synchronizing a first time of the second media content segment to a corresponding first time of the first media content segment, and trimming a length of the second media content segment to a length of the first media content segment. In some examples, synchronizing the first time of the second media content segment to the corresponding first time of the first media content segment comprises: identifying the first time of the first media content segment based on a portion of the first media content segment corresponding to a portion of an audio signal; and identifying the first time of the second media content segment based on a portion of the second media content segment corresponding to the portion of the audio signal. In some examples, determining the quality value of the first media content segment comprises: determining a spatial feature based on a video component of the first media content segment; determining a temporal feature based on the video component of the first media content segment; determining an audio feature of an audio component of the first media content segment; and applying the spatial feature, the temporal feature, and the audio feature as input to an artificial intelligence model. In some examples, the first audio data and first video data received via the first user device comprise audio data and video data received from the first user device via a streaming process; the second audio data and second video data comprise audio data and video data received via a progressive upload process; the first set of encoding parameters is associated with a first bitrate; and the second set of encoding parameters is associated with a second bitrate higher than the first bitrate. In some examples, the method further comprises presenting the media data to a user of the first user device via a conferencing application executing via one or more processors of the first user device. In some examples, each of the first audio data, the first video data, the second audio data, and the second video data comprises data recorded by the first user device at a first time. In some examples, each of the first audio data and the first video data comprises data recorded by the first user device at a first time; each of the second audio data and the second video data comprises data recorded by the first user device at a second time later than the first time; the method further comprises, in response to detecting the fault, communicating a signal to the first user device; and each of the second audio data and the second video data further comprises data recorded by the first user device in response to the first user device receiving the signal. In some examples, the second audio data comprises audio data recorded by the first user device; and the second video data comprises video data recorded by the first user device. In some examples, the second audio data comprises audio data recorded by a second user device; and the second video data comprises video data recorded by the second user device, wherein the first user device and the second user device are in communication with a session of a computer application. In some examples, the second user device comprises a mobile device. In some examples, the method further comprises: in response to detecting the fault, communicating a signal to the second user device, wherein: the fault is associated with a disconnection of the first user device from the session, and each of the second audio data and the second video data further comprises data recorded by the second user device in response to the second user device receiving the signal. In some examples, the first video data comprises a first recording of a performance, the second video data comprises a second recording of the performance, and the second recording differs from the first recording according to a video parameter. In some examples, the video parameter comprises one or more of a view angle, a field of view, a depth of field, a focal point, a lens type, an aspect ratio, an optical filter, and a video processing filter. In some examples, receiving the second media content segment comprises receiving an output of a file size reduction, and replacing the first media content segment with the second media content segment further comprises applying a compensation to the output of the file size reduction. In some examples, the file size reduction comprises a reduction in video resolution, and the compensation comprises an increase in video resolution.

According to some examples, a non-transitory computer-readable medium stores instructions which, when executed by one or more processors, cause the one or more processors to perform a method comprising: receiving media data comprising a first media content segment, the first media content segment comprising first audio data received via a first user device and first video data received via the first user device, the first media content segment encoded according to a first set of encoding parameters; detecting a fault in the first media content segment, wherein detecting the fault comprises determining a quality value of the first media content segment and determining whether the quality value exceeds a threshold; receiving a second media content segment, the second media content segment comprising second audio data and second video data, the second media content segment encoded according to a second set of encoding parameters; and replacing, in the media data, the first media content segment with the second media content segment, wherein replacing the first media content segment with the second media content segment comprises: synchronizing a first time of the second media content segment to a corresponding first time of the first media content segment, and trimming a length of the second media content segment to a length of the first media content segment. In some examples, synchronizing the first time of the second media content segment to the corresponding first time of the first media content segment comprises: identifying the first time of the first media content segment based on a portion of the first media content segment corresponding to a portion of an audio signal; and identifying the first time of the second media content segment based on a portion of the second media content segment corresponding to the portion of the audio signal. In some examples, determining the quality value of the first media content segment comprises: determining a spatial feature based on a video component of the first media content segment; determining a temporal feature based on the video component of the first media content segment; determining an audio feature of an audio component of the first media content segment; and applying the spatial feature, the temporal feature, and the audio feature as input to an artificial intelligence model. In some examples, the first audio data and first video data received via the first user device comprise audio data and video data received from the first user device via a streaming process; the second audio data and second video data comprise audio data and video data received via a progressive upload process; the first set of encoding parameters is associated with a first bitrate; and the second set of encoding parameters is associated with a second bitrate higher than the first bitrate. In some examples, the method further comprises presenting the media data to a user of the first user device via a conferencing application executing via one or more processors of the first user device. In some examples, each of the first audio data, the first video data, the second audio data, and the second video data comprises data recorded by the first user device at a first time. In some examples, each of the first audio data and the first video data comprises data recorded by the first user device at a first time; each of the second audio data and the second video data comprises data recorded by the first user device at a second time later than the first time; the method further comprises, in response to detecting the fault, communicating a signal to the first user device; and each of the second audio data and the second video data further comprises data recorded by the first user device in response to the first user device receiving the signal. In some examples, the second audio data comprises audio data recorded by the first user device; and the second video data comprises video data recorded by the first user device. In some examples, the second audio data comprises audio data recorded by a second user device; and the second video data comprises video data recorded by the second user device, wherein the first user device and the second user device are in communication with a session of a computer application. In some examples, the second user device comprises a mobile device. In some examples, the method further comprises: in response to detecting the fault, communicating a signal to the second user device, wherein the fault is associated with a disconnection of the first user device from the session, and each of the second audio data and the second video data further comprises data recorded by the second user device in response to the second user device receiving the signal. In some examples, the first video data comprises a first recording of a performance, the second video data comprises a second recording of the performance, and the second recording differs from the first recording according to a video parameter. In some examples, the video parameter comprises one or more of a view angle, a field of view, a depth of field, a focal point, a lens type, an aspect ratio, an optical filter, and a video processing filter. In some examples, receiving the second media content segment comprises receiving an output of a file size reduction, and replacing the first media content segment with the second media content segment further comprises applying a compensation to the output of the file size reduction. In some examples, the file size reduction comprises a reduction in video resolution, and the compensation comprises an increase in video resolution.

Although the present invention has been fully described in connection with examples thereof with reference to the accompanying drawings, it is to be noted that various changes and modifications will become apparent to those skilled in the art. Such changes and modifications are to be understood as being included within the scope of the claimed subject matter. The various examples of the invention should be understood that they have been presented by way of example only, and not by way of limitation. Although the invention is described above in terms of various examples and implementations, it should be understood that the various features and functionality described in one or more of the individual examples are not limited in their applicability to the particular example with which they are described. They instead can, be applied, alone or in some combination, to one or more of the other examples of the invention, whether or not such examples are described, and whether or not such features are presented as being a part of a described example. Thus the breadth and scope of the claimed subject matter should not be limited by any of the above-described examples.

Terms and phrases used in this document, and variations thereof, unless otherwise expressly stated, should be construed as open ended as opposed to limiting. As examples of the foregoing, the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known," and terms of similar meaning, should not be construed as limiting the item described to a given time period, or to an item available as of a given time. These terms should instead be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. For example, "at least one" may refer to a single or plural and is not limited to either. The presence of broadening words and phrases such as "one or more," "at least," "but not limited to," or other like phrases in some instances shall not be read to mean that the narrower case is intended or required in instances where such broadening phrases may be absent. The word "exemplary" is used herein to mean "serving as an example or illustration." Any aspect or design described herein as "exemplary" is not necessarily to be construed as preferred or advantageous over other aspects or designs.

It will be appreciated that, for clarity purposes, the above description has described examples of the invention with reference to different functional units and modules. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only to be seen as references to suitable means for providing the described functionality, rather than indicative of a strict logical or physical structure or organization. It should be understood that the specific order or hierarchy of steps in the processes disclosed herein is an example of exemplary approaches. Based upon design preferences, it is understood that the specific order or hierarchy of steps in the processes may be rearranged while remaining within the scope of the claimed subject matter. Further, in some examples, some steps in the processes disclosed herein may be forgone altogether while remaining within the scope of the claimed subject matter.

What is claimed is:

1. A method comprising:
   receiving, at a server, media data comprising a first media content segment, the first media content segment comprising one or more of first audio data uploaded by a first user device and first video data uploaded by the first user device, the first media content segment encoded according to a first set of encoding parameters;
   determining, by the server, whether a fault in the first media content segment has occurred, wherein said determining whether the fault has occurred comprises determining a quality value of the first media content segment, the quality value comprising one or more of a resolution, a bitrate, and a frame rate, and determining whether the quality value exceeds a threshold;
   in accordance with a determination that the fault has occurred, replacing, in the media data, the first media content segment with a second media content segment comprising one or more of second audio data and second video data, the second media content segment encoded according to a second set of encoding parameters;
   in accordance with a determination that the fault has not occurred, forgoing replacing, in the media data, the first media content segment with the second media content segment, and
   providing the media data from the server to a client device for presentation of the media data;
   wherein said replacing the first media content segment with the second media content segment comprises:
      synchronizing a first time of the second media content segment to a corresponding first time of the first media content segment, the first time associated with the fault, and
      trimming a length of the second media content segment based on a length of the first media content segment.

2. The method of claim 1, wherein said synchronizing the first time of the second media content segment to the corresponding first time of the first media content segment comprises:
   identifying the first time of the first media content segment based on a portion of the first media content segment corresponding to a portion of an audio signal; and
   identifying the first time of the second media content segment based on a portion of the second media content segment corresponding to the portion of the audio signal.

3. The method of claim 1, wherein said determining the quality value of the first media content segment comprises:
   determining a spatial feature based on a video component of the first media content segment;
   determining a temporal feature based on the video component of the first media content segment;
   determining an audio feature of an audio component of the first media content segment; and
   applying the spatial feature, the temporal feature, and the audio feature as input to an artificial intelligence model.

4. The method of claim 1, wherein:
   the first media content segment comprises audio data or video data received from the first user device via a streaming process;
   the second media content segment comprises audio data or video data received at the server via a progressive upload process;
   the first set of encoding parameters is associated with a first bitrate; and
   the second set of encoding parameters is associated with a second bitrate higher than the first bitrate.

5. The method of claim 1, wherein the presentation of the media data comprises a presentation of the media data via a conferencing application of the client device.

6. The method of claim 1, wherein each of the first media content segment and the second media content segment comprises data recorded by the first user device at a first time.

7. The method of claim 1, wherein:
   the first media content segment comprises audio data or video data recorded by the first user device;
   the second media content segment comprises audio data or video data recorded by a second user device;
   the method further comprises communicating a signal to the second user device; and
   the second media content segment further comprises audio data or video data recorded in response to the second user device receiving the signal.

8. The method of claim 1, wherein:
   the one or more of second audio data and second video data comprises audio data or video data recorded by the first user device.

9. The method of claim 1, wherein:
   the one or more of second audio data and second video data comprises audio data or video data recorded by the second user device, and
   the first user device and the second user device are in communication with a common session of a computer application.

10. The method of claim 9, wherein the second user device comprises a mobile device.

11. The method of claim 9, wherein the fault is associated with a disconnection of the first user device from the common session.

12. The method of claim 9, wherein:
   the first media content segment comprises a first recording of a performance,
   the second media content segment comprises a second recording of the performance, and the second recording differs from the first recording according to a video parameter.

13. The method of claim 12, wherein the video parameter comprises one or more of a view angle, a field of view, a depth of field, a focal point, a lens type, an aspect ratio, an optical filter, and a video processing filter.

14. The method of claim 1, wherein:
receiving the second media content segment comprises receiving an output of a file size reduction, and
replacing the first media content segment with the second media content segment further comprises applying a compensation to the output of the file size reduction.

15. The method of claim 14, wherein:
the file size reduction comprises a reduction in video resolution, and
the compensation comprises an increase in video resolution.

16. The method of claim 1, wherein the first user device comprises the client device.

17. The method of claim 1, wherein the first set of encoding parameters comprises the second set of encoding parameters.

18. A system comprising:
one or more processors configured to perform a method comprising:
receiving, at a server, media data comprising a first media content segment, the first media content segment comprising one or more of first audio data uploaded by a first user device and first video data uploaded by the first user device, the first media content segment encoded according to a first set of encoding parameters;
determining, by the server, whether a fault in the first media content segment has occurred, wherein said determining whether the fault has occurred comprises determining a quality value of the first media content segment, the quality value comprising one or more of a resolution, a bitrate, and a frame rate, and determining whether the quality value exceeds a threshold;
in accordance with a determination that the fault has occurred, replacing, in the media data, the first media content segment with a second media content segment comprising one or more of second audio data and second video data, the second media content segment encoded according to a second set of encoding parameters;
in accordance with a determination that the fault has not occurred, forgoing replacing, in the media data, the first media content segment with the second media content segment, and
providing the media data from the server to a client device for presentation of the media data;
wherein said replacing the first media content segment with the second media content segment comprises:
synchronizing a first time of the second media content segment to a corresponding first time of the first media content segment, the first time associated with the fault, and
trimming a length of the second media content segment based on a length of the first media content segment.

19. A non-transitory computer-readable medium storing instructions which, when executed by one or more processors, cause the one or more processors to perform a method comprising:
receiving, at a server, media data comprising a first media content segment, the first media content segment comprising one or more of first audio data uploaded by a first user device and first video data uploaded by the first user device, the first media content segment encoded according to a first set of encoding parameters;
determining, by the server, whether a fault in the first media content segment has occurred, wherein said determining whether the fault has occurred comprises determining a quality value of the first media content segment, the quality value comprising one or more of a resolution, a bitrate, and a frame rate, and determining whether the quality value exceeds a threshold;
in accordance with a determination that the fault has occurred, replacing, in the media data, the first media content segment with a second media content segment comprising one or more of second audio data and second video data, the second media content segment encoded according to a second set of encoding parameters;
in accordance with a determination that the fault has not occurred, forgoing replacing, in the media data, the first media content segment with the second media content segment, and
providing the media data from the server to a client device for presentation of the media data;
wherein said replacing the first media content segment with the second media content segment comprises:
synchronizing a first time of the second media content segment to a corresponding first time of the first media content segment, the first time associated with the fault, and
trimming a length of the second media content segment based on a length of the first media content segment.

20. The non-transitory computer-readable medium of claim 19, wherein:
the first media content segment comprises audio data or video data received from the first user device via a streaming process;
the second media content segment comprises audio data or video data received at the server via a progressive upload process;
the first set of encoding parameters is associated with a first bitrate; and
the second set of encoding parameters is associated with a second bitrate higher than the first bitrate.

21. The non-transitory computer-readable medium of claim 19, wherein the first user device comprises the client device.

22. The non-transitory computer-readable medium of claim 19, wherein:
the one or more of second audio data and second video data comprises audio data or video data recorded by the second user device;
the first user device and the second user device are configured to communicate with a common session of a computer application; and
the fault is associated with a disconnection of the first user device from the common session.

23. A method comprising:
receiving, at a server, media data comprising a first media content segment, the first media content segment comprising one or more of first audio data uploaded by a first user device and first video data uploaded by the first user device, the first media content segment encoded according to a first set of encoding parameters;
determining, by the server, whether a fault has occurred, the fault associated with the first media content segment, wherein said determining whether the fault has occurred comprises determining a quality value of the first media content segment, the quality value comprising one or more of a resolution, a bitrate, and a frame rate, and determining whether the quality value exceeds a threshold;

in accordance with a determination that the fault has occurred, replacing, in the media data, the first media content segment with a second media content segment comprising one or more of second audio data and second video data, the second media content segment encoded according to a second set of encoding parameters;

in accordance with a determination that the fault has not occurred, forgoing replacing, in the media data, the first media content segment with the second media content segment, and providing the media data from the server to a client device for presentation of the media data;

wherein said replacing the first media content segment with the second media content segment comprises:

determining, based on an audio signal associated with the first media content segment and further associated with the second media content segment, a first time of the second media content segment and a corresponding first time of the first media content segment;

synchronizing the first time of the second media content segment to the corresponding first time of the first media content segment, and trimming a length of the second media content segment based on a length of the first media content segment.

* * * * *